(12) United States Patent
Sugiura et al.

(10) Patent No.: US 8,221,840 B2
(45) Date of Patent: Jul. 17, 2012

(54) METHOD FOR PRODUCING A CARBON FIBER BUNDLE

(75) Inventors: Naoki Sugiura, Otake (JP); Akihiko Fukushima, Tokyo (JP); Shinobu Fujie, Tokyo (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 44 days.

(21) Appl. No.: 12/500,382

(22) Filed: Jul. 9, 2009

(65) Prior Publication Data

US 2009/0317550 A1 Dec. 24, 2009

Related U.S. Application Data

(62) Division of application No. 10/566,473, filed as application No. PCT/JP2004/011053 on Aug. 2, 2004.

(30) Foreign Application Priority Data

| Jul. 31, 2003 | (JP) | 2003-283882 |
| Jul. 31, 2003 | (JP) | 2003-283902 |
| Jul. 31, 2003 | (JP) | 2003-283903 |

(51) Int. Cl.
| B05D 3/12 | (2006.01) |
| D02G 3/00 | (2006.01) |
| B32B 18/00 | (2006.01) |
| D01F 9/12 | (2006.01) |
| C08G 59/00 | (2006.01) |

(52) U.S. Cl. ............ 427/293; 427/289; 427/385.5; 427/47.1; 423/447.1; 423/447.2; 525/438; 525/205; 525/244; 525/285; 525/301; 428/408; 428/902; 428/294.4; 428/299.1; 428/367

(58) Field of Classification Search .......... 8/115.6; 428/288, 367, 375, 378, 391, 392, 408, 370, 428/65.9; 525/438, 403, 437, 432, 452; 156/250; 427/293, 289, 385.5, 407.1

See application file for complete search history.

(56) References Cited

U.S. PATENT DOCUMENTS

| 3,806,489 A | | 4/1974 | Rieux et al. | |
| 4,751,270 A | * | 6/1988 | Urawa et al. | 525/244 |
| 5,081,186 A | * | 1/1992 | Mitsuno et al. | 525/71 |
| 5,167,945 A | | 12/1992 | Ogawa et al. | |
| 5,227,238 A | * | 7/1993 | Hirai et al. | 428/369 |
| 5,415,905 A | * | 5/1995 | Middlesworth et al. | 428/35.7 |
| 5,525,180 A | * | 6/1996 | Paul et al. | 156/250 |
| 5,641,572 A | * | 6/1997 | Yoshimura et al. | 428/408 |
| 5,654,059 A | * | 8/1997 | Hecht | 428/65.9 |
| 6,066,395 A | * | 5/2000 | Miyoshi et al. | 428/367 |
| 6,569,523 B2 | * | 5/2003 | Ikeda et al. | 428/357 |

FOREIGN PATENT DOCUMENTS

| JP | 60-53544 | | 3/1985 |
| JP | 62-288633 | | 12/1987 |
| JP | 5-195440 | | 8/1993 |
| JP | 05261729 A | * | 10/1993 |
| JP | 06-107442 | | 4/1994 |
| JP | 06107442 A | * | 4/1994 |
| JP | 6-173170 | | 6/1994 |
| JP | 9-291480 | | 11/1997 |
| JP | 2003-166174 | | 6/2003 |
| JP | 2004011030 A | * | 1/2004 |

OTHER PUBLICATIONS

Polyolefin definition. Wikipedia Online Encyclopedia. May 23, 2010.*

Wikipedia. Polyolefin Definition. Date May 23, 2010. p. 1.*

* cited by examiner

*Primary Examiner* — Elizabeth Cole
*Assistant Examiner* — Altrev Sykes
(74) *Attorney, Agent, or Firm* — Oblon, Spivak, McClelland, Maier & Neustadt, L.L.P.

(57) ABSTRACT

A method to prepare a carbon fiber bundle which can develop satisfactory interfacial adhesion to polyolefin-based resins, especially polypropylene resins, is provided. The carbon fiber bundle comprises a plurality of single fibers sized with a sizing agent comprising: a polymer having a main chain formed of carbon-carbon bonds, containing an acid group in at least part of side chains or at least a part of main chain ends, and having an acid value of 23 to 120 mg KOH/g as measured in accordance with ASTM D1386; or a polymer having a main chain formed of carbon-carbon bonds and containing at least either of an epoxy group and an ester group in at least a part of side chains or at least a part of main chain ends.

1 Claim, No Drawings

METHOD FOR PRODUCING A CARBON FIBER BUNDLE

CROSS REFERENCE TO RELATED APPLICATIONS

This application is a divisional application of prior U.S. application Ser. No. 10/566,473, filed Jan. 31, 2006, the disclosure of which is incorporated herein in its entirety. The parent application is the National Stage of PCT/JP04/11053, filed Aug. 2, 2004, the disclosure of which is incorporated herein in its entirety. The parent application claims priority to Japanese Application Nos. 2003-283882, filed Jul. 31, 2003, 2003-283902, filed Jul. 31, 2003, and JP 2003-283903, filed Jul. 31, 2003, the disclosures of which are incorporated herein in their entireties.

TECHNICAL FIELD

The present invention relates to a carbon fiber bundle, and method for producing the same, which can be used as a thermoplastic reinforcing material. The present invention further relates to a thermoplastic resin composition, and molded article thereof, which uses such a carbon fiber bundle.

BACKGROUND ART

A carbon fiber bundle is a form gathering together a plurality single fibers consisting of carbon, and is used as a reinforcing material for thermoplastic resins or the like.

When used as a reinforcing material for thermoplastic resins, carbon fiber bundles are usually supplied being a form cut into lengths of 5 to 15 mm. During production of pellets obtained by kneading this carbon fiber bundles and a thermoplastic resin, it is necessary to supply the carbon fiber bundles in a fixed quantity into an extruder. In order to do this, the form stability of the carbon fiber bundles is important. A form that is not suitable can become a cause for discharge unevenness. Also, because a fixed extrusion rate cannot be attained, strand breakage occurs, whereby there is the risk of pellet productivity dramatically falling.

Materials known as long-fiber pellets are also attracting attention, in which carbon fiber bundles having a continuous fiber form are charged in the pellet production process. During this process, fluff or fly is easily formed on the carbon fiber bundle, or, the bundle is easily loosened, so that the handling is difficult.

Carbon fiber bundles can also be formed into a fabric and used as a sheet material impregnated with a thermoplastic resin, wherein the weaving quality of the carbon fiber bundles, the handleability of the cloth after being woven and the like are important properties.

For reasons as described above, to improve carbon fiber bundle handleability and the physical properties of a material into which carbon fiber bundles have been blended, it is conventional to use carbon fiber bundles which have been converged by a sizing treatment which deposits, for example, about 2 to 5 wt % of a sizing agent that is compatible with the matrix resin, such as an agent having an epoxy resin as a main component.

Examples of the thermoplastic resin used as the matrix resin typically include polycarbonate resin, nylon resin, polyester resin and the like. Recently, however, the number of cases of using a polyolefin-based resin has been increasing for reasons of recyclability and cost. Polypropylene resin in particular has been drawing attention in recent years.

Since polyolefin-based resins are basically nonpolar, their interfacial adhesion with the carbon fibers or glass fibers is extremely poor and the effects of improved mechanical properties as a reinforcing material cannot be adequately expressed in many cases. Countermeasures for this are known to include a method which improves adhesion by adding an acid modified polyolefin-based resin to the matrix resin, and a method which subjects the carbon fibers or glass fibers to a sizing treatment with a sizing agent constituted from a polyolefin-based resin and a silane coupling agent and the like. Another known method, as described in Japanese Patent Application Laid-Open No. 6-107442 (Patent Document 1), subjects the carbon fibers or glass fibers to a sizing treatment using a sizing agent having acid modified polypropylene as an essential component.

However, in the method which adds an acid modified polyolefin-based resin to the matrix resin, a large amount of acid modified polyolefin-based resin has to be added, whereby a product having excellent recyclability and cost effectiveness cannot be obtained. On the other hand, in the method sizing with a sizing agent containing a silane coupling agent, because carbon fibers do not have so many oxygen groups on the surface as compared with glass fibers, the effects for improving interfacial adhesion are rather minimal.

Further, although the method sizing with a sizing agent having acid modified polypropylene as an essential component described in Patent Document 1 achieves good interfacial adhesion as compared with a polyolefin-based resin, in the case of carbon fibers the effects were not sufficient.

Patent Document 1: Japanese Patent Application Laid-Open No. 6-107442

DISCLOSURE OF THE INVENTION

Problems to be Solved by the Invention

The present invention was created in view of the above-described matters, wherein it is an object thereof to provide a carbon fiber bundle which can develop satisfactory interfacial adhesion with a polyolefin-based resin, especially polypropylene resin.

Means for Solving the Problems

The present invention includes:
a carbon fiber bundle comprising a plurality of single fibers, and sized with a sizing agent comprising:
a polymer having a main chain formed of carbon-carbon bonds, containing an acid group in at least a part of side chains or at least a part of main chain ends, and representing an acid value of 23 to 120 mgKOH/g as measured in accordance with ASTM D1386; or
a polymer having a main chain formed of carbon-carbon bonds, and containing at least either of an epoxy group and an ester group in at least a part of side chains or at least a part of main chain ends. The present invention especially includes the following embodiments:

(1) The carbon fiber bundle, wherein the sizing was conducted after pre-sized with a pre-sizing agent consisting of an epoxy resin;

(2) The carbon fiber bundle, wherein the single fibers comprise a plurality of wrinkles on their surface, wherein a vertical difference between a highest portion and a lowest portion in a region defined by 2 μm of circumferential length×1 μm of fiber axial direction length of the single fibers is 40 nm or more.

The method for producing the carbon fiber bundle of the above (1) especially includes the following embodiment:

A method for producing a carbon fiber bundle comprising a plurality of single fibers, comprising the steps of:

pre-sizing the carbon fiber bundle with a pre-sizing agent consisting of an epoxy resin;

sizing the pre-sized carbon fiber bundle, so that an amount of a sizing agent to the total is 1 to 5 wt %, by using an aqueous sizing agent solution dissolving or dispersing in water the sizing agent comprising:

a polymer having a main chain formed of carbon-carbon bonds, containing an acid group in at least a part of side chains or at least a part of main chain ends, and representing an acid value of 23 to 120 mgKOH/g as measured in accordance with ASTM D1386; or a polymer having a main chain formed of carbon-carbon bonds, containing at least either of an epoxy group and an ester group in at least a part of side chains or at least a part of main chain ends;

cutting the carbon fiber bundle to a prescribed length; and
drying the carbon fiber bundle cut to the prescribed length.

The method for producing the carbon fiber bundle of the above (2) especially includes the following preferable embodiment:

A method for producing a carbon fiber bundle comprising a plurality of single fibers, wherein the single fibers comprise a plurality of wrinkles on their surface, wherein a vertical difference between a highest portion and a lowest portion in a region defined by 2 μm of circumferential length×1 μm of fiber axial direction length of the single fibers is 40 nm or more, comprising the steps of:

sizing the carbon fiber bundle, so that an amount of a sizing agent to the total is 1 to 5 wt %, by using an aqueous sizing agent solution dissolving or dispersing in water the sizing agent comprising:

a polymer having a main chain formed of carbon-carbon bonds, containing an acid group in at least a part of side chains or at least a part of main chain ends, and representing an acid value of 23 to 120 mgKOH/g as measured in accordance with ASTM D1386; or a polymer having a main chain formed of carbon-carbon bonds, containing at least either of an epoxy group and an ester group in at least a part of side chains or at least a part of main chain ends;

cutting the carbon fiber bundle to a prescribed length with regulating the moisture content of the carbon fiber bundle to 20 to 60 wt %; and drying the carbon fiber bundle cut to a prescribed length.

In addition, the present invention includes a thermoplastic resin composition comprising a thermoplastic resin and the carbon fiber bundle, wherein the carbon fiber bundle content is 3 to 60 wt %.

Further, the present invention includes a molded article obtained by molding the thermoplastic resin composition.

Effects of the Invention

According to the carbon fiber bundle of the present invention, satisfactory interfacial adhesion with polyolefin-based resins, especially polypropylene resin, can be developed.

BEST MODE FOR CARRYING OUT THE INVENTION

The carbon fiber bundle according to the present invention is a carbon fiber bundle comprising a plurality of single fibers, and sized with a sizing agent comprising:

a polymer having a main chain formed of carbon-carbon bonds, containing an acid group in at least a part of side chains or at least a part of main chain ends, and representing an acid value of 23 to 120 mgKOH/g as measured in accordance with ASTM D1386; or a polymer having a main chain formed of carbon-carbon bonds, and containing at least either of an epoxy group and an ester group in at least a part of side chains or at least a part of main chain ends. Especially, following preferable embodiments are provided:

(1) The carbon fiber bundle, wherein the sizing was conducted after pre-sized with a pre-sizing agent consisting of an epoxy resin;

(2) The carbon fiber bundle, wherein the single fibers comprise a plurality of wrinkles on their surface, wherein a vertical difference between a highest portion and a lowest portion in a region defined by 2 μm of circumferential length×1 μm of fiber axial direction length of the single fibers is 40 nm or more.

(Carbon Fiber Bundle Before Sizing)

In the present invention there are no particular limits on the carbon fiber bundle before sizing, so that a carbon fiber bundle comprising a plurality of known single fibers can be employed. Normally, it is a form gathering together about 1,000 to 50,000 single fibers having an average diameter of 5 to 8 μm. The single fibers constituting such a carbon fiber bundle are obtained by making an acrylonitrile polymer, pitch obtained from petroleum or coal, or the like into a fiber, and then carbonizing the fiber. Fibers that can be used include those which have undergone the carbonizing treatment, fibers which have undergone a wet electrolytic oxidation treatment to thereby incorporate an oxygen-containing functional group onto the surface, and fibers which have bee pre-sized.

In particular, examples of a carbon fiber bundle before sizing which can be preferably used in the present invention include:

(I-1) A carbon fiber bundle comprising a plurality of single fibers, wherein the single fibers comprise a plurality of wrinkles on their surface, wherein a vertical difference between a highest portion and a lowest portion in a region defined by 2 μm of circumferential length×1 μm of fiber axial direction length of the single fibers is 40 nm or more; and (I-2) A carbon fiber bundle pre-sized with a pre-sizing agent consisting of an epoxy resin.

In the present invention, the carbon fiber bundle preferably comprises a plurality of single fibers, wherein the single fibers comprise a plurality of wrinkles on their surface, wherein a vertical difference between a highest portion and a lowest portion in a region defined by 2 μm of circumferential length×1 μm of fiber axial direction length of the single fibers is 40 nm or more (I-1). Further, the vertical difference between the highest portion and the lowest portion is preferably 10% or less of the diameter of the single fibers. The depth of the wrinkles which are present on the single fiber surface is defined by the vertical difference between the highest portion and the lowest portion in the region defined by 2 μm of circumferential length×1 μm of fiber axial direction length. A wrinkle on the single fiber surface refers to an uneven shape having a length of 1 μm or more in a given direction. This direction is not particularly limited, and may be parallel, perpendicular or at an angle to the fiber axial direction. In the general production method for a carbon fiber bundle comprising a plurality of single fibers, wrinkles which are approximately parallel to the fiber axial direction are present on the usual single fiber surface. The vertical difference can be estimated in the following manner based on the surface shape obtained by scanning the surface of the single fibers with a scanning atomic force microscope (AFM).

Several single fibers of a carbon fiber bundle are placed onto a specimen stage, and fixed at both ends. Dotite is applied around their periphery to form measurement samples. Employing a cantilever made from silicon nitride, an atomic force microscope (Model: SPI 3700/SPA-300 (trade name), manufactured by Seiko Instruments Inc.) is used to measure in AFM mode by repeatedly scanning a 2 to 7 μm range in the periphery direction of the single fibers while slowly moving in 1 μm intervals across the fibers in a fiber axial direction. The low frequency component of the obtained measured images is cut by two-dimensional Fourier transform, and the cut images then undergo an inverse transform. The vertical difference between the highest portion and the lowest portion in the region defined by 2 μm of circumferential length×1 μm of fiber axial direction length is then read from the planar image of the cross-section from which the obtained single fiber curvature has been removed.

Examples of a carbon fiber bundle having a plurality of such single fibers include, for example, TR50S and TR30L (trade names), manufactured by Mitsubishi Rayon Co., Ltd.

The above-described single fibers preferably have a ratio of major axis to minor axis (major axis/minor axis) of the cross-section of 1.03 to 1.20. If the major axis/minor axis is less than 1.03, adhesion between the single fibers is so strong as a result of the sizing agent after sizing, which worsens the loosening property of the single fibers when mixed or impregnated with the resin, whereby on occasion an evenly dispersed molded article cannot be obtained. If the major axis/minor axis is more than 1.20, the adhesion between single fibers is so weak, and the carbon fiber bundle is easily loosened, whereby on occasion stability during the fixed length cutting step and the morphological stability of the carbon fiber bundle after being cut may deteriorate. Especially preferable is 1.05 to 1.15. The above-described major axis/minor axis value can be measured as described below.

After passing the carbon fiber bundle to be measured through a tube with the inner diameter of 1 mm made from a vinyl chloride resin, the carbon fiber bundle is cut with a knife into round slices to be used as specimens. These specimens are then adhered with their cross-section facing upwards onto a SEM specimen stage, and sputtered with Au to a 10 nm thickness. The cross-sections are then observed with a scanning electron microscope (XL20 (trade name), manufactured by Philips) under the conditions of an accelerating voltage of 7.00 kV, and operating distance of 31 mm, and the major axis and minor axis of the single fiber cross-section are then measured.

The above-described single fibers preferably have a Si content of 500 ppm or less as measured by ICP emission spectrometry. If the Si content is more than 500 ppm, the wettability and interfacial adhesion with the matrix resin can deteriorate. Especially preferable is 350 ppm or less. The above-described Si content can be measured as described below.

A carbon fiber bundle is placed in a platinum crucible with a known tare and incinerated in a muffle furnace at from 600 to 700° C. The incinerated matter is weighed to obtain the ash content. A fixed amount of sodium carbonate is subsequently charged thereto, and the resulting mixture is melted by a burner and is dissolving with DI water (ion-exchange water) to be a constant volume in a 50 ml plastic graduated flask. The Si content of this sample is then obtained by ICP emission spectrometry.

In the present invention, the carbon fiber bundle has preferably been pre-sized with a pre-sizing agent consisting of an epoxy resin (I-2). The pre-sizing treatment refers to a treatment for depositing a pre-sizing agent onto the carbon fiber bundle. This pre-sizing treatment allows the convergence of the carbon fiber bundle to be increased, while simultaneously also enabling the affinity of the below-described pre-sizing agents with the carbon fiber bundle to be increased.

A pre-sizing agent consisting of an epoxy resin is preferable because of its excellent affinity with the single fibers of the carbon fiber bundle and handleability, and also because just a small amount can cause the single fibers to converge. In addition, a carbon fiber bundle which has been pre-sized with a pre-sizing agent consisting of an epoxy resin provides a significantly excellent process passing; for instance the carbon fiber bundle does not wind onto the roller during the subsequent sizing step. Further, wettability with the sizing agent used in the present invention is satisfactory, whereby the sizing agent can be evenly deposited.

When a carbon fiber bundle is pre-sized with a pre-sizing agent consisting of an epoxy resin, usually, an aqueous pre-sizing agent solution is used in which a water-soluble or water-dispersible epoxy resin is dissolved or dispersed in water. The water-soluble or water-dispersible epoxy resin is not particularly restricted, so that a known resin can be used. If the resin can be used in an aqueous solution, a modified epoxy resin can also be used. In addition, a single kind of epoxy resin can be used alone, or 2 or more kinds can be used mixed together. From the viewpoint of process passing for the below-described step for depositing the sizing agent and other factors, it is more preferable that a resin which is liquid at room temperature and a resin which is solid at room temperature are used in combination as the epoxy resin.

Examples of water-soluble epoxy resins include resins having glycidyl groups on both ends of a ethylene glycol chain, and resins having glycidyl groups on both ends of ethylene oxide added on both ends of bisphenol A, F, S, etc. A compound having an alicyclic epoxy group in place of the glycidyl group can also be used.

Examples of water-dispersible epoxy resins include bisphenol A type epoxy resins, bisphenol F type epoxy resins and bisphenol S type epoxy resins, phenol novolak type epoxy resins, cresol novolak type epoxy resins, biphenyl type epoxy resins, naphthalene-skeleton type epoxy resins, aliphatic-based epoxy resins, dicyclopentadiene type epoxy resins (e.g. HP 7200 (trade name) manufactured by Dainippon Ink and Chemicals, Incorporated), glycidyl amine type epoxy resins, and DPP novolak type epoxy resins (e.g. Epikote 157S65 (trade name) manufactured by Japan Epoxy Resins Co., Ltd.). A compound having an alicyclic epoxy group in place of the glycidyl group can also be used.

If using a pre-sizing agent consisting of a water-dispersible epoxy resin, it is preferable to conduct the pre-sizing treatment with an aqueous emulsion to which an emulsifier has been further added. The emulsifier is not particularly restricted, so that anionic, cationic, nonionic or the like emulsifiers can be used. Among these, anionic or nonionic emulsifiers are preferable, as they have good emulsification property, and are low cost. Non-ionic emulsifiers are especially preferable, as they do not interfere with pre-sizing agent stability.

Examples of nonionic emulsifiers include polyethylene glycol type (higher alcohol ethylene oxide adducts, alkylphenol ethylene oxide adducts, aliphatic ethylene oxide adducts, polypropylene glycol ethylene oxide adducts and the like), and polyhydric alcohol type (glycerin fatty acid esters, sorbitol fatty acid esters, fatty acid alkanolamide and the like). However, the HLB of the nonionic emulsifier is usually 8 to 20. If a nonionic emulsifier is used whose HLB is outside of this range, a stable aqueous emulsion may not be attained.

Examples of anionic emulsifiers include carboxylate type (potassium oleate, sodium oleate and the like), sulfonate type (sodium dodecylbenzene sulfonate, sodium dioctylsulfosuccinate and the like), and sulfate type (sodium lauryl sulfate and the like). Examples of the neutralizer include potassium hydroxide, sodium hydroxide, magnesium hydroxide, calcium hydroxide, sodium carbonate, sodium bicarbonate, potassium carbonate, potassium bicarbonate, calcium carbonate, calcium bicarbonate, magnesium carbonate, magnesium bicarbonate, monolaurylamine, trimethylamine, dimethyl monoethanolamine, triethanolamine, ethylenediamine, ammonia, and the like. Examples of the reducing agents include sodium sulfite and the like.

Examples of the emulsification method include a method which employs a batch system with a stirrer, a method which employs a ball mill, a method which employs a shaking apparatus and a method which employs a high-shear emulsion machine, such as a Gaulin homogenizer. By setting the emulsification temperature higher than the softening temperature of the pre-sizing agent to be used, an aqueous emulsion can be obtained which has sufficient stability. The time required for emulsification is usually several minutes to 2 hours. After emulsification, an aqueous emulsion can be obtained by cooling to room temperature. While the aqueous emulsion concentration is not particularly limited, the emulsion is diluted with water so as to have the pre-sizing agent concentration of about 5 to 60 wt %.

For an aqueous emulsion in which a pre-sizing agent is dispersed, other sizing agents (e.g. vinyl acetate resin emulsion, urethane resin emulsion, acrylic resin emulsion or the like), a silane coupling agent, and an antistatic agent can be used in combination as necessary. In addition, a lubricant or smoothing agent can also be used in combination therewith.

The amount of such a pre-sizing agent deposited is preferably 0.1 to 2.0 wt % to the total carbon fiber bundle, and 0.2 to 1.2 is more preferable. This range is preferable because within such a range the number of molecular layers of the pre-sizing agent covering the carbon fiber surface of the carbon fiber bundle is about 1 to 3. If the amount deposited is more than 2.0 wt %, the pre-sizing agent acts to cause bridging between the carbon fibers to cause pseudo-adhesion between the single fibers and to constrain movement of single fibers, whereby the carbon fiber bundle become less spreadable, which can even result in a risk that the uniformity of the carbon fiber bundle is harmed. Further, the permeability of the sizing agent which is deposited in a later step is interfered with, whereby there is a risk of a deterioration in the properties as a carbon fiber bundle, such as it becoming more difficult to obtain a uniform carbon fiber bundle. On the other hand, if the amount deposited is less than 0.1 wt %, the effects of depositing the pre-sizing agent are not exhibited, whereby there is a risk that a carbon fiber bundle having excellent process passing, handleability, and affinity with the sizing agent cannot be obtained.

The pre-sizing treatment can be carried out in the same manner as that for the below-described sizing treatment with a sizing agent.

(Sizing Agent Used in the Sizing Treatment)

In the present invention, the carbon fiber bundle is sized with a sizing agent comprising:

a polymer having a main chain formed of carbon-carbon bonds, containing an acid group in at least a part of side chains or at least a part of main chain ends, and representing an acid value of 23 to 120 mgKOH/g as measured in accordance with ASTM D1386; or a polymer having a main chain formed of carbon-carbon bonds, containing at least either of an epoxy group and an ester group in at least a part of side chains or at least a part of main chain ends.

The method of sizing treatment according to the present invention comprises a step for depositing a sizing agent which comprises the above-described polymer onto a carbon fiber bundle. As mentioned above, a carbon fiber bundle onto which a sizing agent comprising the above-described polymer is deposited may be one pre-sized, in which case the method of sizing treatment comprises a pre-sizing step with a pre-sizing agent and a main sizing step with a sizing agent comprising the above-described polymer. From this sizing treatment, convergence of the carbon fiber bundle can be further increased, and at the same time the affinity of the carbon fiber bundle with the matrix resin can be increased.

In particular, examples of preferable sizing agents in the present invention include:

(i) A sizing agent comprising at least 35 wt % of an acid modified polypropylene resin (compound a1) having a weight average molecular weight of 45,000 or less, and an acid value of 23 to 120 mgKOH/g as measured in accordance with ASTM D1386;

(ii) A sizing agent comprising at least 35 wt % of an acid modified polypropylene resin (compound a2) having a number average molecular weight of 45,000 or less, and an acid value of 23 to 120 mg KOH/g as measured in accordance with ASTM D1386, and at least 5 wt % of an olefin-based thermoplastic elastomer resin (compound b);

(iii) A sizing agent comprising at least 40 wt % of a copolymer (compound c) obtained by copolymerizing ethylene or propylene and an epoxy-containing monomer;

(iv) A sizing agent comprising at least 40 wt % of a copolymer (compound d) obtained by copolymerizing ethylene or propylene, an epoxy-containing monomer and an acrylic ester; and (v) A sizing agent comprising at least 40 wt % of copolymer components consisting of the compound c and the compound d.

The acid modified polypropylene resin (compound a1), which is an essential component of the sizing agent represented by the above-described (i), is the component to act as an efficient coupling agent, which the acidic group in the molecule boost the interaction with the single fiber surface of the carbon fiber bundle or the pre-sizing agent deposited to the carbon fiber bundle surface when the complex of the carbon fiber bundles and polyolefin-based resin or other such matrix resin is formed, while the polypropylene chain in the skeleton causes strong bonds to form with the matrix resin as a result of the molecules being entangled together. Therefore, the acid modified polypropylene resin (compound a1) preferably comprises 35 wt % or more of the sizing agent and more preferably 40 wt % or more.

The weight average molecular weight of the acid modified polypropylene resin (compound a1) is preferably 45,000 or less, more preferably 30,000 or less and further preferably 20,000 or less. If the weight average molecular weight is more than 45,000, the mobility in the interfacial phase vicinity may be insufficient, and the intermolecular entanglement with the matrix resin may be lower, whereby interfacial adhesion cannot be made sufficiently strong. Further, from the viewpoint of the required molecule length for exhibiting coupling effects at the interfacial phase of a carbon fiber bundle and the resin, weight average molecular weight is preferably 500 or more. Here, the weight average molecular weight is measured by GPC.

The acid value as measured in accordance with ASTM D1386 of the acid modified polypropylene resin (compound a1) is preferably 23 to 120 mgKOH/g, more preferably 29 to 90 mgKOH/g, further preferably 35 to 80 mgKOH/g and especially preferably 40 to 75 mgKOH/g. If the acid value is less than 23 mgKOH/g, interaction with the single fiber surface of the carbon fiber bundle or the pre-sizing agent deposited to the carbon fiber bundle surface is low, whereby high interfacial adhesion cannot be obtained. On the other hand, if the acid value is more than 120 mgKOH/g, affinity with the matrix resin, especially with a polyolefin-based resin, deteriorates, whereby consequently entangling with the molecules does not sufficiently occur, wherein interfacial adhesion cannot be made sufficiently strong.

Specific examples of such an acid modified polypropylene resin (compound a1) include GF-101 (Trade name, aqueous emulsion) manufactured by Yoshimura Oil Chemical Co., Ltd., Hostamont AR 503 and AR 504 (trade names) manufactured by Clariant and the like.

The sizing agent represented by the above-described (i) preferably further comprises at least 5 wt % of an olefin-based thermoplastic elastomer resin (compound b). The olefin-based thermoplastic elastomer resin (compound b) may make the carbon fiber bundle sufficiently convergent and drapable. Also, it keeps itself sufficient affinity with the polyolefin-based resin or other such matrix resin. More preferable is 8 wt % or more. The weight ratio between the acid modified polypropylene resin (compound a1) and the olefin-based thermoplastic elastomer resin (compound b) is preferably 15/1 to 1/1.

The Vicat softening point as measured in accordance with ASTM D1525-70 of the olefin-based thermoplastic elastomer resin (compound b) is preferably 120° C. or less. More preferable is 110° C. or less, and further preferable is 90° C. or less. This is because the carbon fiber bundle after it is dried will be satisfactory convergent if the olefin-based thermoplastic elastomer resin (compound b) has been sufficiently softened for during the step evaporating off the water, which are usually conducted at about 140° C., after depositing an aqueous sizing agent solution in which a sizing agent has been dissolved or dispersed in water.

Specific examples of such an olefin-based thermoplastic elastomer resin (compound b) include GFE-1030 (Trade name, aqueous emulsion) manufactured by Yoshimura Oil Chemical Co., Ltd., TPO-M142, R110E and T310E (trade names) manufactured by Idemitsu Petrochemical Co., Ltd., and the like.

The acid modified polypropylene resin (compound a2), which is an essential component of the sizing agent represented by the above-described (ii), is the component to act as an efficient coupling agent, which the acidic group in the molecule boost the interaction with the single fiber surface of the carbon fiber bundle or the pre-sizing agent deposited to the carbon fiber bundle surface when the complex of the carbon fiber bundles and polyolefin-based resin or other such matrix resin is formed, while the polypropylene chain in the skeleton causes strong bonds to form with the matrix resin as a result of the molecules being entangled together.

The number average molecular weight of the acid modified polypropylene resin (compound a2) is preferably 45,000 or less, more preferably 30,000 or less, further preferably 20,000 or less and especially preferably 10,000 or less. If the weight average molecular weight is more than 45,000, the mobility in the interfacial phase vicinity may be insufficient, and the intermolecular entanglement with the matrix resin may be lower, whereby interfacial adhesion cannot be made sufficiently strong. Further, from the viewpoint of the required molecule length for exhibiting coupling effects at the interfacial phase of a carbon fiber bundle and the resin, number average molecular weight is preferably 500 or more. Here, the number average molecular weight is measured by GPC.

The acid value as measured in accordance with ASTM D1386 of the acid modified polypropylene resin (compound a2) is preferably 23 to 120 mgKOH/g, more preferably 29 to 90 mgKOH/g, and further preferably 35 to 80 mgKOH/g. If the acid value is less than 23 mgKOH/g, interaction with the single fiber surface of the carbon fiber bundle or the pre-sizing agent deposited to the carbon fiber bundle surface is low, whereby high interfacial adhesion cannot be obtained. On the other hand, if the acid value is more than 120 mgKOH/g, affinity with the matrix resin, especially with a polyolefin-based resin, deteriorates, whereby consequently entangling with the molecules does not sufficiently occur, wherein interfacial adhesion cannot be made sufficiently strong.

Specific examples of such an acid modified polypropylene resin (compound a2) include GF-101 (Trade name, aqueous emulsion) manufactured by Yoshimura Oil Chemical Co., Ltd., Hostamont AR 503 and AR 504 (trade names) manufactured by Clariant and the like.

The olefin-based thermoplastic elastomer resin (compound b) contained in the sizing agent represented by the above-described (ii) may make the carbon fiber bundle sufficiently convergent and drapable. Also, it keeps itself sufficient affinity with the polyolefin-based resin or other such matrix resin.

The Vicat softening point as measured in accordance with ASTM D1525-70 of the olefin-based thermoplastic elastomer resin (compound b) is preferably 120° C. or less. More preferable is 110° C. or less, and further preferable is 90° C. or less. This is because the carbon fiber bundle after it is dried will be satisfactory convergent if the olefin-based thermoplastic elastomer resin (compound b) has been sufficiently softened for during the step evaporating off the water, which are usually conducted at about 140° C., after depositing an aqueous sizing agent solution in which a sizing agent has been dissolved or dispersed in water.

Specific examples of such an olefin-based thermoplastic elastomer resin (compound b) include GFE-1030 (Trade name, aqueous emulsion) manufactured by Yoshimura Oil Chemical Co., Ltd., TPO-M142, R110E and T310E (the above are trade names) manufactured by Idemitsu Petrochemical Co., Ltd. and the like.

The sizing agent represented by the above-described (ii) preferably further comprises 35 wt % or more, preferably 40 wt % or more, of the acid modified polypropylene resin (compound a2), and 5 wt % or more, preferably 8 wt % or more, of the olefin-based thermoplastic elastomer resin (compound b). Since these two compounds take on an important role in the manner described above, in order to effectively express their roles their minimum content is respectively independently prescribed. The weight ratio between the acid modified polypropylene resin (compound a1) and the olefin-based thermoplastic elastomer resin (compound b) is preferably 15/1 to 1/1.

The essential components of the sizing agents represented by the above-described (iii) to (v), that is a copolymer component consisting of one or both of a copolymer (compound c) obtained by copolymerizing ethylene or propylene and an epoxy-containing monomer, and a copolymer (compound d) obtained by copolymerizing ethylene or propylene, an epoxy-containing monomer and an acrylic ester, act extremely efficiently as a coupling agent between the matrix resin such as a polyolefin-based resin and the carbon fiber bundle. The reason for this is that since the main skeleton of the polymer is formed from ethylene or propylene units, its compatibility with the matrix resin is very excellent, and further, that since an epoxy group is contained in the molecule, a strong chemical interaction can be formed with the single fiber surface of the carbon fiber bundle or the pre-sizing agent deposited to the carbon fiber bundle surface. The sizing agent contains these copolymer components of preferably 40 wt % or more, more preferably 50 wt % or more. If less than 40 wt %, the improved performance of interfacial adhesion due to the copolymer components cannot be sufficiently exhibited in some cases. The copolymer (compound c) obtained by copolymerizing ethylene or propylene and an epoxy-containing monomer can be used alone ((iii)). The copolymer (compound d) obtained by copolymerizing ethylene or propylene, an epoxy-containing monomer and an acrylic ester can be used alone ((iv)). The copolymer (compound c) obtained by copolymerizing ethylene or propylene and an epoxy-containing monomer and the copolymer (compound d) obtained by copolymerizing ethylene or propylene, an epoxy-containing monomer and an acrylic ester can be used together ((v)).

The ratio of units derived from the epoxy-containing monomer in these copolymer components, although not particularly limited, is preferably 5% or more by mole ratio, and more preferably 10% or more, in order for the effects of the epoxy group to be expressed. The Vicat softening point of these copolymer components, although not particularly limited, is preferably 120° C. or less, more preferably 110° C. or less, and further preferably 90° C. or less. This is, as described above, because satisfactory convergence of the carbon fiber bundle after the drying step can be conferred.

Examples of such a copolymer (compound c) obtained by copolymerizing ethylene or propylene and an epoxy-containing monomer include Bondfast 2C and Bondfast E (trade names) manufactured by Sumitomo Chemical Co., Ltd., Rexpearl RA3150 (trade name) manufactured by Japan Polyolefin Corporation, Sepolsion G118 (trade name) manufactured by Sumitomo Seika Chemicals Co., Ltd., and the like. Examples of a copolymer (compound d) obtained by copolymerizing ethylene or propylene, an epoxy-containing monomer and an acrylic ester include Bondfast 7L and Bondfast 7M (trade names) manufactured by Sumitomo Chemical Co., Ltd., and the like.

The sizing agent represented by the above-described (iii) to (v) preferably further comprises a copolymer (compound e) of ethylene or propylene, an acrylic ester and a monomer containing an acid anhydride group. Copolymer (compound e) of ethylene or propylene, an acrylic ester and a monomer containing an acid anhydride group also acts extremely efficiently as a coupling agent between the matrix resin such as a polyolefin-based resin and the carbon fiber bundle. The reason for this is that since the main skeleton of the polymer is formed from ethylene or propylene units, its compatibility with the matrix resin is very excellent, and further, that since an acid group is contained in the molecule, a strong chemical interaction can be formed with the single fiber surface of the carbon fiber bundle or the pre-sizing agent deposited to the carbon fiber bundle surface. The sizing agent contains the copolymer (compound e) of ethylene or propylene, an acrylic ester and a monomer containing an acid anhydride group of preferably 40 wt % or more, more preferably 50 wt % or more. If less than 40 wt %, the improved performance of interfacial adhesion due to this copolymer component cannot be sufficiently exhibited in some cases.

The Vicat softening point of the copolymer (compound e) of ethylene or propylene, an acrylic ester and a monomer containing an acid anhydride group, although not particularly limited, is preferably 120° C. or less and more preferably 110° C. or less. This is, as described above, because satisfactory convergence of the carbon fiber bundle after the drying step can be conferred.

Specific examples of such a copolymer (compound e) of ethylene or propylene, an acrylic ester and a monomer containing an acid anhydride group include the Bondine (registered trademark) series, manufactured by Sumitomo Chemical Co., Ltd., the Rexpearl ET series (trade name) manufactured by Japan Polyolefin Corporation, Sepolsion M220E (trade name) manufactured by Sumitomo Seika Chemicals Co., Ltd., and the like.

The amount of the sizing agent deposited onto a carbon fiber bundle in all these embodiments is not particularly restricted, and may be set as the amount necessary to express the desired functions from the sizing agent. For example, for a carbon fiber bundle in continuous form, the amount deposited is preferably 0.3 to 5 wt % of the total. Especially preferable is 0.8 to 4 wt %. Further, for a carbon fiber bundle cut to a prescribed length, from 1 to 5 wt % is preferable. Especially preferable is 1.2 to 4 wt %. If t there is too little sizing agent, the bundle may be inadequately convergent and the form stability of the cut bundle may deteriorate. If there is too much sizing agent, in some cases wettability during the blending step with the resin and the loosening property for the single fibers dramatically deteriorate. The amount of sizing agent deposited onto a carbon fiber bundle is, as the component amount excluding water of the carbon fiber bundle total, the amount of the sizing agent deposited measured by thermal decomposition in accordance with SACMA method SRM 14-90. When conducting a pre-sizing treatment, this can be calculated by subtracting the amount of the pre-sizing agent deposited which is separately-measured.

(Sizing Method)

When sizing with an above-described sizing agent, usually, the carbon fiber bundle is sized with an aqueous sizing agent solution in which the sizing agent is dissolved or dispersed in water. Giving consideration to industrial production, it is preferable in terms of safety and economy to carry out the sizing treatment with an aqueous emulsion in which the sizing agent is dispersed in water. In such a case, a surfactant can be used as an emulsifier for the purpose of evenly dispersing the components in water. The emulsifier at such a stage is not particularly restricted, so that anionic, cationic, nonionic or the like emulsifiers can be used. Among these, anionic or nonionic emulsifiers are preferable, as they have good emulsification property, and are low cost. Further, as is described below, when adding a silane coupling agent into the aqueous emulsion, nonionic emulsifiers are especially preferable, in terms of its stability of the silane coupling agent in the water and also in terms of the stability of the physical properties of the molded article.

Examples of nonionic emulsifiers include polyethylene glycol type (higher alcohol ethylene oxide adducts, alkylphenol ethylene oxide adducts, aliphatic ethylene oxide adducts, polypropylene glycol ethylene oxide adducts and the like), and polyhydric alcohol type (glycerin fatty acid esters, sorbitol fatty acid esters, fatty acid alkanolamide and the like). However, the HLB of the nonionic emulsifier is usually 8 to 20. If a nonionic emulsifier is used whose HLB is outside of this range, a stable aqueous emulsion may not be attained.

Examples of anionic emulsifiers include carboxylate type (potassium oleate, sodium oleate and the like), sulfonate type (sodium dodecylbenzene sulfonate, sodium dioctylsulfo succinate and the like), and sulfate type (sodium lauryl sulfate and the like). Examples of the neutralizer include potassium hydroxide, sodium hydroxide, magnesium hydroxide, calcium hydroxide, sodium carbonate, sodium bicarbonate, potassium carbonate, potassium bicarbonate, calcium carbonate, calcium bicarbonate, magnesium carbonate, magnesium bicarbonate, monolaurylamine, trimethylamine, dimethyl monoethanolamine, triethanolamine, ethylenediamine, ammonia and the like. Examples of the reducing agents include sodium sulfite and the like.

Examples of the emulsification method include a method which employs a batch provided with a stirrer, a method which employs a ball mill, a method which employs a shaking apparatus and a method which employs a high-shear emulsion machine, such as a Gaulin homogenizer. By setting the emulsification temperature higher than the softening temperature of the sizing agent to be used, an aqueous emulsion can be obtained which has sufficient stability. The time required for emulsification is usually several minutes to 2 hours. After emulsification, an aqueous emulsion can be obtained by cooling to room temperature. While the aqueous emulsion concentration is not particularly limited, the emulsion is diluted with water so as to have the sizing agent concentration of about 5 to 60 wt %.

For an aqueous emulsion in which a sizing agent is dispersed, other sizing agents (e.g. vinyl acetate resin emulsion, urethane resin emulsion, acrylic resin emulsion, epoxy resin emulsion or the like), a silane coupling agent, and an antistatic agent can be used in combination as necessary. In addition, a lubricant or smoothing agent can also be used in combination therewith.

Examples of silane coupling agents which can be used include a silane coupling agent having in the molecule any one of an epoxy group, a vinyl group, an amino group, a methacrylic group, an acrylic group and a straight chain alkyl group. The silane coupling agent can be employed alone, or two or more kinds thereof can be employed mixed together. Among silane coupling agents, epoxy silanes, amino silanes and straight chain silanes having in the molecule an epoxy group, an amino group or a straight chain alkyl group are particularly preferable. Preferable examples for a epoxy group contained in the silane coupling agent of epoxy silanes include glycidyl groups, alicyclic epoxy groups and the like, and specific examples of the silane coupling agent include A-186, A-187, AZ-6137, AZ-6165 (trade names) manufactured by Nippon Unicar Company Limited and the like. Examples of the silane coupling agent of amino silanes agent include substances having a primary amine, a secondary amine, or both of these, and specific examples include A-1100, A-1110, A-1120, Y-9669, A-1160 (trade names) manufactured by Nippon Unicar Company Limited and the like. Examples of straight chain alkyl silanes include substances having a hexyl group, an octyl group or a decyl group and specific examples include AZ-6171, AZ-6177 (trade names) manufactured by Nippon Unicar Company Limited, and KBM-3103C (trade name) manufactured by Shin-Etsu Chemical Co., Ltd. and the like.

The amount of silane coupling agent is preferably 5 wt % or less, more preferably 4 wt % or less, with respect to 100 wt % of the total component amount (total solid amount) excluding water of the aqueous emulsion in which the sizing agent is dispersed. If the amount added is more than 5 wt %, crosslinking of the silane coupling agent proceeds, whereby the carbon fiber bundle become hard and brittle, to be a reason to form longitudinal cracks and to lower interfacial adhesion.

Examples of a method for sizing with an aqueous sizing agent solution containing a sizing agent such as that described above include a touch roll method which deposits the aqueous sizing agent solution by contacting the roll with a carbon fiber bundle consisting of single carbon fibers after surface transcription by dipping part of a roll in an aqueous sizing agent solution, and a dipping method which controls the amount of the aqueous sizing agent solution deposited by directly dipping a carbon fiber bundle consisting of single carbon fibers into an aqueous sizing agent solution and then passing it through a nip roll as necessary. Between these the touch roll method is preferable. Especially preferable in terms of the amount of sizing agent deposited or bundle width control is a method wherein a carbon fiber bundle is brought into contact with a plurality of touch rolls and then the aqueous sizing agent solution is deposited over multiple stages. Subsequently, pre-drying and heat treatment are carried out as necessary. The specific conditions can be selected as appropriate so that the carbon fiber bundles can express the desired properties.

(Sized Carbon Fiber Bundles)

The carbon fiber bundle according to the present invention may be in continuous form or may be cut to a prescribed length.

The mass per unit length of a carbon fiber bundle cut to a prescribed length is preferably 0.4 to 15 g/m. A carbon fiber bundle having a mass per unit length less than 0.4 g/m is not only economically disadvantageous, but also may affect the incorporating process passing of the carbon fiber bundle in the pellet production step. On the other hand, if greater than 15 g/m, it becomes more difficult to completely carry out impregnation of the carbon fiber bundles into the aqueous sizing agent solution, and it may be more difficult to produce a carbon fiber bundle having a stable form. More preferable is 0.6 to 10 g/m, and especially preferable is 0.8 to 8 g/m.

Although the method of cutting the carbon fiber bundle is not particularly limited, a rotary cutter method is preferable. Further, the cut length (length of the carbon fiber bundles) may be 2 to 30 mm, preferably 4 to 24 mm and more preferably 6 to 20 mm. A rotary cutter method allows the cut length to be regulated by adjusting the interval between the teeth of the apparatus being used.

When cutting by a rotary cutter method, if the carbon fiber bundle thickness becomes too thick to result cutting defects, operation impossibility by winding a carbon fiber bundle around the rotor, and form irregularities after cutting, it is advantageous for the carbon fiber bundle thickness to be thin. In the case of the carbon fiber bundle having a large mass per unit length whose mass per unit length is more than 1.5 g/m, it is important that the fibers of the carbon fiber bundle are opened up as much as possible so that the aqueous sizing agent solution can be evenly deposited as far as the interior portions of the carbon fiber bundle. Therefore, it is preferable to transfer in a manner with essentially no twisting of the carbon fiber bundle while controlling so that the carbon fiber bundle width/thickness increases using a guide roll, comb guide, spreader bar and the like.

However, if the width of a carbon fiber bundle cut to a prescribed thickness widens, longitudinal cracks form more easily along the fiber orientation direction, whereby maintaining the form tends to be more difficult during production or when used after being produced. This tendency is especially pronounced in carbon fiber bundles having a large mass per unit length. Therefore, it is preferable to control the width/thickness of the carbon fiber bundle of 3 to 10 by adjusting the width of a guide attached to the rotary cutter. If width/thickness is 3 or more, the occurrence of miscuts during the cutting process using a rotary cutter can be suppressed. If width/thickness is more than 10, although miscuts during cutting are less likely to occur, the thickness becomes too thin, whereby it is easier for longitudinal cracks of the carbon fiber bundle to form after cutting to give rise to the risk that subsequent process passing may deteriorate. Further, to cut a carbon fiber bundles having a large mass per unit length thinly and broadly in the manner of a conventional type, the number of carbon fibers which can be simultaneously treated decreases, so that to make up for the decreased amount the cutter width needs to be broadened or the treatment speed has to be increased, thereby inviting the risk of increasing the load placed on equipment or decreasing the production efficiency.

This cutting is preferably conducted on a carbon fiber bundle which is in a moist state after the aqueous sizing agent solution has been deposited to the carbon fiber bundle. This utilizes convergent effect caused by the surface tension of the aqueous sizing solution and absorption of impact shearing stress generated during the cutting by soft state in a moist of to prevent fiber cracking. During the cutting, preferable is a moist state in which the moisture content of a carbon fiber bundle is 20 to 60 wt %, especially 25 to 50 wt %. If the moisture content is less than 20 wt %, fiber cracking and fluff are more likely to occur during cutting. On the other hand, if the moisture content is more than 60 wt %, water is excessively deposited to the single fiber surface, thereby increasing the risk that single fibers converge in a circle due to the surface tension of the water, thus causing higher incidence of miscuts and blade clogging during cutting. In addition, extra treatments can be carried out prior to cutting using water or an aqueous sizing agent solution to adjust the moisture content, as necessary.

Examples of a method for drying the carbon fiber bundle after cutting include hot-air drying. If a hot-air drying method is employed, the bundle is preferably dried while it is transferred with vibrating, because not only the moisture evaporation efficiency is improved, but the carbon fiber bundles can be prevented from adhering together. If the vibration is too vigorously during drying, fiber cracking may occur more readily, and the ratio of carbon fiber bundles having a width/thickness of less than 3 may increase. If the vibration is too weak, pseudo-adhesion takes place between the fibers, which leads to a bunched up form. Accordingly, it is necessary to set to appropriate vibration conditions. In order to not only eliminate the fragmented carbon fiber bundles, but improve the hot-air flow, it is more preferable to vibrate and dry while transferring on a vibrating mesh. Further, to improve drying efficiency, auxiliary means, such as infrared emission can also be simultaneously used.

(Thermoplastic Resin Composition)

The carbon fiber bundle according to the present invention can be formed into a thermoplastic resin composition by kneading with a thermoplastic resin as the matrix resin. When kneading a carbon fiber bundle into thermoplastic resin, preferably the carbon fiber bundles are fed into an extruder in a continuous form or a form that has been cut into predetermined lengths, and then kneaded with the thermoplastic resin to form into pellets. The thermoplastic resin composition according to the present invention can also provide an arbitrarily shaped molded article (carbon fiber reinforced composite molded article) by molding in accordance with a well-known molding method such as injection molding or the like.

Concerning preparation of the thermoplastic resin composition according to the present invention, 3 and 60 wt %, more preferably 5 to 50 wt %, of the carbon fiber bundle according to the present invention preferably are blended. By blending 3 wt % or more of the carbon fiber bundles, the improved effect on mechanical properties of the molded article is remarkable. On the other hand, if this exceeds 60 wt %, no further remarkable improvement in effects is seen, while the process stability during pellet production may deteriorate and additionally unevenness or the like may occur in the pellets, whereby there is the risk that quality stability of the molded article may worsen.

The thermoplastic resin used as the matrix resin in the present invention is not particularly restricted, but an polyolefin-based resin is most preferable, due to its affinity with the sizing agent deposited to the single fibers of the carbon fiber bundle. Other examples include at least one selected from the group consisting of a polycarbonate resin, ABS resin, AS resin, polyoxymethylene resin, nylon resin, polyphenylene sulfide resin, polyether sulfine resin, polyether imide resin, polyester resin and alloy-based resins thereof. Especially when employing a polyolefin-based resin as the matrix resin, a small amount of various modified polyolefin-based resins may be added to further improve the mechanical properties.

A molded article obtained by molding the thermoplastic resin according to the present invention has excellent mechanical properties, as well as excellent production efficiency and economic cost. Such a molded article is suitable for automotive parts, housing parts of a portable electric appliance, housing parts of common home electric appliances and the like.

EXAMPLES

The present invention will now be explained in further detail with reference to the following Examples. The measurement and evaluation of the various properties in the present Examples was conducted in accordance with the following methods.

(Depth of the Wrinkle on the Surface of Single Fibers of Carbon Fiber Bundle)

The depth of wrinkles which are present on the surface of single fibers of the carbon fiber bundle according to the present invention was measured from the vertical difference between a highest portion and a lowest portion in a region defined by 2 µm of circumferential length×1 µm of fiber axial direction length. The vertical difference was measured based on a surface shape obtained by scanning the surface of the single fibers with a scanning atomic force microscope (AFM). Specifically, this was as follows.

Several single fibers of a carbon fiber bundle were placed onto a specimen stage, and fixed at both ends. Dotite was applied around their periphery to form measurement samples. Employing a cantilever made from silicon nitride, an atomic force microscope (Model: SPI 3700/SPA-300 (trade name), manufactured by Seiko Instruments Inc.) was used to measure in AFM mode by repeatedly scanning a 2 to 7 µm range in the periphery direction of the single fibers while slowly moving in 1 µm intervals across the fibers in a fiber axial direction. The low frequency component of the obtained measured images was cut by two-dimensional Fourier transform, and the cut images then underwent an inverse transform. The vertical difference between the highest portion and the lowest portion in the region defined by 2 µm of circumferential length×1 µm of fiber axial direction length was then read and evaluated from the planar image of the cross-section from which the obtained single fiber curvature had been removed.

(Ratio of Major Axis to Minor Axis (Major Axis/Minor Axis) of Single Fiber Cross-Sections in Carbon Fiber Bundle)

After passing the carbon fiber bundle to be measured through a tube with the inner diameter of 1 mm made from a vinyl chloride resin, the carbon fiber bundle was cut with a knife into round slices to be used as specimens. These specimens were then adhered with their cross-section facing upwards onto a SEM specimen stage, and sputtered with Au to a 10 nm thickness. The cross-sections were then observed with a scanning electron microscope (XL20 (trade name) manufactured by Philips) under the conditions of an accelerating voltage of 7.00 kV, and operating distance of 31 mm, for evaluation by measuring the major axis and minor axis of the single fiber cross-sections.

(Strand Strength and Strand Elastic Modulus)

These evaluated in accordance with JIS R7601.

(Amount of Pre-Sizing Agent Deposited)

The amount of the pre-sizing agent deposited on a pre-sized carbon fiber bundle was measured by the Soxhlet extraction method using methylethylketone in accordance with JIS R7601.

(Amount of Sizing Agent Deposited)

The amount of the sizing agent deposited on a sized carbon fiber was measured by thermal decomposition in accordance with SACMA method SRM 14-90. When the bundle was pre-sized and then sized, the amount of the sizing agent deposited was determined by calculating the increase from the amount of pre-sizing agent deposited which is already determined separately.

(Moisture Content)

A carbon fiber bundle cut to a prescribed length was dried for hour at 110° C. The weight change before and after drying was taken as the moisture content.

(Si Content)

A carbon fiber bundle was placed in a platinum crucible with a known tare and incinerated in a muffle furnace at 600 to 700° C. The incinerated matter is weighed to obtain the ash content. A fixed amount of sodium carbonate is subsequently charged thereto, and the resulting mixture is melted by a burner and is dissolved in DI water (ion-exchange water) to be a constant volume in a 50 ml plastic graduated flask. The Si amount of this sample is then obtained by ICP emission spectrometry.

(Evaluation of Mechanical Properties of Molded Articles)

Tensile strength at break was evaluated in accordance with JIS K7113, bending strength and elastic modulus were evaluated in accordance with JIS K7203, and Izod strength (⅛" notch, ⅛" reverse notch) was evaluated in accordance with ASTM D256. These measurements were conducted at room temperature.

<Carbon Fiber Bundles (Raw Materials)>

The carbon fiber bundles TR50S, TR30L, MR40 and TR40 (trade names, manufactured by Mitsubishi Rayon Co., Ltd.; non-pre-sized products) consisting of 12,000 or 50,000 filaments which use polyacrylic fiber as their raw material, were employed as the raw materials.

In addition, the carbon fiber bundle (raw material) CF1 was prepared according to the following method.

A spinning solution of an acrylonitrile-based polymer dissolved in dimethylacetoamide was expelled into a first coagulation bath containing an aqueous dimethylacetoamide solution at a concentration of 50 to 70 wt % and a temperature of 30 to 50° C., to thereby form coagulated fibers. Next, the coagulated fibers were drawn by a fixed length in a second coagulation bath containing an aqueous dimethylacetoamide solution at a concentration of 50 to 70 wt % and a temperature of 30 to 50° C. The resulting product was wet-heat drawn by 4-fold or more to thereby obtain a carbon fiber precursor fiber bundle. The ratio of the major axis and minor axis of the carbon fiber precursor fiber bundle cross-section and the depth of the wrinkles formed on the surface can be adjusted by changing the concentration and temperature of the second coagulation bath, as well as by changing the drawing conditions. A silicon-based oil was then deposited to maintain the stability of the carbon fiber precursor fiber bundle.

Subsequently, a plurality of carbon fiber precursor fiber bundles were aligned in parallel and placed into a furnace for flame-proofing treatment. An oxidizing gas such as air heated to 200 to 300° C. was blown onto the carbon fiber precursor fiber bundles to flame-proof the carbon fiber precursor fiber bundles, whereby flame-proofed fiber bundles were obtained. Next, these flame-proofed fiber bundles were placed in a carbonizing furnace, and carbonized in an inert atmosphere at a temperature of 1,200 to 1,400° C. To improve the affinity with the resin, a wet electrolytic oxidation treatment was then employed to incorporate an oxygen-containing functional group onto the surfaces, whereby the carbon fiber bundle (raw material) CF1 was produced.

The properties of the above-described carbon fiber bundles (raw materials) are shown in Table 1.

TABLE 1

| Carbon fiber bundle (raw material) | TR50S | TR30L | MR40 | TR40 | CF1 |
|---|---|---|---|---|---|
| Depth of the wrinkle (nm) | 100 | 100 | 10 | 10 | 100 |
| Major axis/minor axis | 1.08 | 1.08 | 1.00 | 1.00 | 1.08 |
| Mass per unit length (g/m) | 0.80 | 3.33 | 0.60 | 0.83 | 0.80 |
| Number of single fibers | 12,000 | 50,000 | 12,000 | 12,000 | 12,000 |
| Si content (ppm) | 300 | 300 | 140 | 140 | 900 |
| Strand strength (MPa) | 4700 | 4400 | 4500 | 4500 | 4600 |
| Strand elastic modulus (GPa) | 240 | 240 | 295 | 235 | 240 |

<Pre-Sizing Treatment>

The above-described carbon fiber bundles (raw materials) were pre-sized as necessary with a water-dispersible pre-sizing agent consisting of an epoxy compound, then dried and wound onto a bobbin. A pre-sizing agent having the following composition was used adjusting the condition so that the amount deposited was 0.5 wt %.

(Main Agent)

50 parts by weight of "Epikote 828" (trade name) manufactured by Japan Epoxy Resins Co., Ltd.

30 parts by weight of "Epikote 1001" (trade name) manufactured by Japan Epoxy Resins Co., Ltd.

(Emulsifier)

20 parts by weight of "Pluronic F88" (trade name) manufactured by Asahi Denka Co., Ltd.

<Production of Carbon Fiber Bundles I to XVI>

The carbon fiber bundles (raw materials) shown in Tables 4 and 5 were passed through a opening bar and a carbon fiber width-regulating bar alternatingly by multiple times to set them to a certain carbon fiber width, after which they were sized with a given sizing agent. The sizing agents shown in Tables 4 and 5 were used among the sizing agents A to J which were prepared by blending the compounds shown in Table 2 in the ratio shown in Table 3. The aqueous emulsions were used where the sizing agent concentration was adjusted as shown in Tables 4 to 6 by regulating the water content. The touch roll method described below was employed to deposit the aqueous emulsions.

(Touch Roll Method)

After surface transcription onto the touch roll surface was carried out by dipping part of the touch roll in a bath of the aqueous emulsion, the aqueous emulsion was then deposited by contacting the carbon fiber bundles (raw materials) onto the touch roll. This treatment was performed on both the front and back sides by using two touch rolls.

Next, the carbon fiber bundles were cut to a prescribed length (6 mm) by using a rotary cutter and finally dried by being continuously charged into a floor-vibrating hot-air furnace set at 150° C., to thereby yield carbon fiber bundles I to XVI.

The employed aqueous emulsions all possessed satisfactory emulsion stability. The carbon fiber bundle throughput and cutting process during the sizing treatment were also satisfactory. After drying, no cracks were formed in any of the carbon fiber bundles. The evaluated results for the produced carbon fiber bundles I to XVI are shown in Tables 4 and 5.

TABLE 3

| Sizing Agent | | A | B | C | D | E | F | G | H | I |
|---|---|---|---|---|---|---|---|---|---|---|
| Compound a | GF-101 | 70 | | | | 70 | 70 | | | |
| Compound b | GFE-1030 | 27 | | | | 30 | 27 | 47 | | |
| Compound c | Sepolsion G118 | | 97 | | 60 | | | | | |
| Compound d | Bondfast 7M | | | 97 | | | | | | |
| Compound e | Sepolsion M220E | | | | 37 | | | | | |
| Others | OREVAC CA100 | | | | | | | | 50 | |
| | Hydran HW-930 | | | | | | | | 97 | |
| | Epoxy-based sizing agent | | | | | | | | | 97 |
| | A-187 | 3 | 3 | 3 | 3 | | | 3 | 3 | 3 |
| | A-1100 | | | | | | 3 | | | |

The numbers are represent the percentage by weight of each component except the water contained in the respective component.

TABLE 2

| Kind | Product Number (product name) | Details |
|---|---|---|
| Compound a | GF-101 | Acid modified polypropylene (aqueous emulsion containing 10 wt % or less emulsifier) Number average molecular weight: 4,500 Acid value: 47 mgKOH/g Manufactured by Yoshimura Oil Chemical Co., Ltd. |
| Compound b | GFE-1030 | Olefin-based thermoplastic elastomer (aqueous emulsion containing 10 wt % or less emulsifier) Vicat softening temperature: 56° C. Manufactured by Yoshimura Oil Chemical Co., Ltd. |
| Compound c | Sepolsion G118 | Copolymer of ethylene or propylene and an epoxy-containing monomer (main component: ethylene-glycidyl methacrylate copolymer) (aqueous emulsion containing 10 wt % or less emulsifier) Vicat softening temperature: 70° C. Manufactured by Sumitomo Seika Chemicals Co., Ltd. |
| Compound d | Bondfast 7M | Copolymer of ethylene or propylene, an epoxy-containing monomer and an acrylic ester (main component: ethylene-glycidyl methacrylate-methyl acrylate copolymer) (used as an aqueous emulsion adding 20 wt % of an emulsifier*) Vicat softening temperature: 25° C. or less Manufactured by Sumitomo Chemical Co., Ltd. |
| Compound e | Sepolsion M220E | Copolymer of ethylene or propylene, an acrylic ester and a monomer containing an acid anhydride group (main component: ethylene-ethyl acrylate-maleic anhydride copolymer) (aqueous emulsion containing 10 wt % or less emulsifier) Vicat softening temperature: 60° C. Manufactured by Sumitomo Seika Chemicals Co., Ltd. |
| Others | OREVAC CA100 | Acid modified polypropylene (used as an aqueous emulsion adding 20 wt % of an emulsifier*) Acid value: 12 mgKOH/g Manufactured by Atofina Japan |
| | Hydran HW-930 | Urethane-based sizing agent (aqueous emulsion) Manufactured by Dainippon Ink and Chemicals, Incorporated |
| | Epoxy-based sizing agent | Epoxy-based sizing agent (aqueous emulsion, EP1001/EP1002/F88 = 40/40/20 (weight ratio)) EP1001, EP1002: bisphenol A diglycidyl ether Manufactured by Japan Epoxy Resins Co., Ltd. (trade name) F88: Pluronic-type polyether (surfactant) Manufactured by Asahi Denka Co., Ltd. (trade name) |
| | A-187 | Epoxy silane coupling agent Manufactured by Nippon Unicar Company Limited |
| | A-1100 | Amino silane coupling agent Manufactured by Nippon Unicar Company Limited |

*Pluronic F88 (trade name) manufactured by Asahi Denka Co., Ltd.

TABLE 4

| Produced carbon fiber bundle | | I | II | III | IV | V | VI | VII | VIII |
|---|---|---|---|---|---|---|---|---|---|
| Carbon fiber bundle (raw material) | | TR50S | TR30L | TR50S | TR50S | TR50S | TR50S | TR50S | TR40 |
| Pre-sizing treatment | | No | No | No | No | No | No | No | No |
| Sizing | Kind | A | A | B | C | D | E | F | A |
| agent | Concentration (wt %) | 6.0 | 6.5 | 6.0 | 6.0 | 6.0 | 6.0 | 6.0 | 5.0 |
| | Amount deposited (wt %) | 2.5 | 2.7 | 2.5 | 2.5 | 2.5 | 2.5 | 2.5 | 2.0 |
| Moisture content (wt %) | | 42 | 40 | 42 | 42 | 42 | 42 | 42 | 40 |
| Carbon fiber bundle width (mm) | | 8 | 20 | 8 | 8 | 8 | 8 | 8 | 8 |
| Carbon fiber bundle width/thickness | | 4 | 6 | 4 | 4 | 4 | 4 | 4 | 4 |
| presence of cracks | | No | No | No | No | No | No | No | No |

TABLE 5

| Produced carbon fiber bundle | | IX | X | XI | XII | XIII | XIV | XV | XVI |
|---|---|---|---|---|---|---|---|---|---|
| Carbon fiber bundle (raw material) | | MR40 | CF1 | TR50S | TR30L | TR50S | TR50S | TR50S | TR50S |
| Pre-sizing treatment | | No | No | Yes | Yes | Yes | No | Yes | Yes |
| Sizing | Kind | A | A | A | A | B | G | H | I |
| agent | Concentration (wt %) | 5.0 | 6.0 | 6.0 | 6.5 | 6.0 | 6.0 | 6.0 | 6.0 |
| | Amount deposited (wt %) | 2.0 | 2.5 | 2.5 | 2.7 | 2.5 | 2.5 | 2.5 | 2.5 |
| Moisture content (wt %) | | 40 | 42 | 42 | 40 | 42 | 42 | 42 | 42 |
| Carbon fiber bundle width (mm) | | 6 | 8 | 8 | 20 | 8 | 8 | 8 | 8 |
| Carbon fiber bundle width/thickness | | 4 | 4 | 4 | 6 | 4 | 4 | 4 | 4 |
| presence of cracks | | No | No | No | No | No | No | No | No |

Examples 1 to 13 and Comparative Examples 1 to 3

Production of the Pellets and Molded Articles of the Thermoplastic Resin Composition 68 parts by weight of a polypropylene resin (EPR co-polymer polypropylene; trade name: J-5051 HP, manufactured by Idemitsu Petrochemical Co., Ltd.) and 12 parts by weight of a modified polypropylene resin (maleic anhydride co-polymer polypropylene master batch P503, manufactured by Mitsubishi Chemical Corporation) were charged into a twin screw extruder heated to 250° C. 20 parts by weight of the carbon fiber bundles shown in Tables 6 and 7 were charged via a side feeder, and the resulting mixture was kneaded, whereby pellets of the thermoplastic resin composition were obtained. In none of the examples, there were any residue in the twin screw extruder.

The obtained pellets of the thermoplastic resin composition were manufactured into a molded article by screw inline molder of a 20 mmφ and 35 ounce under conditions of a cylinder temperature of 250° C. and a die temperature of 60° C. The mechanical properties of the obtained molded articles are shown in Tables 6 and 7. The molded articles according to Examples 1 to 13 were superior to those of Comparative Examples 1 to 3 in tensile strength at break, bending strength and Izod strength. It was thereby learned that the carbon fiber bundle according to the present invention possessed satisfactory interfacial adhesion.

TABLE 6

| | Example | | | | | | | |
|---|---|---|---|---|---|---|---|---|
| | 1 | 2 | 3 | 4 | 5 | 6 | 7 | 8 |
| Carbon Fiber Bundle | I | II | III | IV | V | VI | VII | VIII |
| Tensile Strength at Break (MPa) | 110 | 100 | 95 | 95 | 95 | 105 | 100 | 80 |
| Bending Strength (MPa) | 150 | 140 | 135 | 135 | 134 | 145 | 140 | 115 |
| Bending elastic modulus (MPa) | 7500 | 7400 | 7300 | 7400 | 7300 | 7400 | 7400 | 7200 |
| Izod Strength (1/8" notch) (J/m) | 80 | 75 | 75 | 72 | 70 | 85 | 75 | 70 |
| Izod Strength (1/8" reverse notch) (J/m) | 240 | 230 | 230 | 220 | 220 | 250 | 240 | 200 |

TABLE 7

| | Example | | | | | Comp. Example | | |
|---|---|---|---|---|---|---|---|---|
| | 9 | 10 | 11 | 12 | 13 | 1 | 2 | 3 |
| Carbon Fiber Bundle | IX | X | XI | XII | XIII | XIV | XV | XVI |
| Tensile Strength at Break (MPa) | 75 | 90 | 135 | 125 | 120 | 67 | 65 | 57 |
| Bending Strength (MPa) | 110 | 125 | 175 | 170 | 165 | 97 | 94 | 80 |
| Bending elastic modulus (MPa) | 8400 | 7200 | 7500 | 7400 | 7400 | 6800 | 6800 | 6300 |
| Izod Strength (1/8" notch) (J/m) | 70 | 70 | 85 | 80 | 85 | 67 | 65 | 45 |
| Izod Strength (1/8" reverse notch) (J/m) | 190 | 210 | 270 | 270 | 260 | 190 | 180 | 110 |

Examples 14 and 15, and Comparative Example 4

Production of the Pellets and Molded Articles of the Thermoplastic Resin Composition 80 parts by weight of a polypropylene resin (EPR copolymer polypropylene; trade name: J-5051 HP, manufactured by Idemitsu Petrochemical Co., Ltd.) were charged into a twin screw extruder heated to 250° C. 20 parts by weight of the carbon fiber bundles shown in Table 8 were charged via a side feeder, and the resulting mixture was kneaded, whereby pellets of the thermoplastic resin composition were obtained. In none of the examples, there were any residue in the twin screw extruder.

The obtained pellets of the thermoplastic resin composition were manufactured into a molded article by screw inline molder of a 20 mm+ and 35 ounce under conditions of a cylinder temperature of 250° C. and a die temperature of 60° C. The mechanical properties of the obtained molded articles are shown in Table 8. The molded articles according to Examples 14 and 15 were superior to the molded article of Comparative Example 4 in tensile strength at break, bending strength and Izod strength. It was thereby learned that the carbon fiber bundle according to the present invention possessed satisfactory interfacial adhesion.

TABLE 8

|  | Example | | Comp. Example |
|---|---|---|---|
|  | 14 | 15 | 4 |
| Carbon Fiber Bundle | XI | I | XVI |
| Tensile Strength at Break (MPa) | 90 | 70 | 40 |
| Bending Strength (MPa) | 105 | 90 | 56 |
| Bending elastic modulus (MPa) | 7300 | 7300 | 5100 |
| Izod Strength (⅛" notch) (J/m) | 80 | 70 | 50 |
| Izod Strength (⅛" reverse notch) (J/m) | 140 | 110 | 90 |

INDUSTRIAL APPLICABILITY

The method according to the present invention provides a carbon fiber bundle which is suitable for use in a thermoplastic resin composition by kneading with a thermoplastic resin serving as a matrix resin. Further, by molding such a thermoplastic resin composition, the present invention is suitable for producing a molded article (carbon fiber reinforced composite molded article). Such a molded article has excellent mechanical properties, and is also superior in terms of production efficiency and economic cost, and is thus suitable for automotive parts, housing parts of a portable electric appliances, housing parts of common home electric appliances and the like.

The invention claimed is:

1. A method for producing a carbon fiber bundle, comprising:
    pre-sizing a carbon fiber bundle with an epoxy resin;
    treating the pre-sized carbon fiber bundle with an aqueous sizing agent solution to obtain a sized wet carbon fiber bundle;
    cutting the sized wet carbon fiber bundle to a prescribed length while regulating the moisture content of the pre-sized and treated carbon fiber bundle to 40 to 60 wt %; and
    drying the carbon fiber bundle cut to the prescribed length,
    wherein
    the carbon fiber bundle which is to be treated comprises a plurality of single fibers, which comprise a plurality of wrinkles on their surface, wherein a vertical difference between a highest portion and a lowest portion in a region defined by 2 μm of circumferential length×1 μm of fiber axial direction length of the single fibers is 40 nm or more,
    an amount of a sizing agent to the total weight is 1 to 5 wt %, and
    the aqueous sizing agent solution is obtained by dissolving or dispersing in water, a sizing agent comprising:
    a polymer having a main chain formed of carbon-carbon bonds which is selected from the group consisting of polypropylene, polyethylene and a copolymer of propylene and ethylene, comprising an acid group in at least a part of side chains or at least a part of main chain ends, wherein an acid value of the polymer comprising acid groups is 23 to 120 mg KOH/g as measured in accordance with ASTM D1386; and
    an olefin-based thermoplastic elastomer resin having a Vicat softening point of 120° C. or less as measured according to ASTM D1525-70,
    wherein
    a weight ratio of the polymer having a main chain formed of carbon-carbon bonds to the olefin-based thermoplastic elastomer resin is from 15/1 to 1/1.

* * * * *